Patented Dec. 13, 1949

2,491,113

UNITED STATES PATENT OFFICE 2,491,113

WATER-BORNE ALUMINUM COATINGS ON PAPER

Stanley J. Johnson, Portland, Maine, assignor to S. D. Warren Company, Boston, Mass., a corporation of Massachusetts No Drawing. Application January 14, 1946, Serial No. 641,173

3 Claims. (Cl. 260—6)

The present invention relates to paper coating art, and is concerned with a mode of insolubilizing the casein of a finely divided aluminum-casein coating whereby to enlarge the scope of usefulness of paper products coated therewith.

It is essential to "solubilize" casein for use in the aqueous phase of a paper coating composition, containing clay or the like as mineral component, and it is conventional to solubilize the casein for such purpose by treating the same with caustic alkali. It is conventional, also, to insolubilize the casein component of an aqueous clay-casein coating mixture, following the dispersion of the clay in the casein solution by treating the mixture with formaldehyde or dimethylolurea.

In preparing aqueous paper coating compositions containing finely divided aluminum suspended in an aqueous solution of casein as the adhesive component, in which compositions a special dispersing agent is necessary, or at least desirable, it was found (as described in copending application Serial No. 641,172, filed January 14, 1946, in the name of John Alfred Bicknell, now Patent No. 2,459,408) that the use of urea as main solubilizing agent for the casein, in conjunction with a dispersing agent such as sodium pyrophosphate, yields a desirable composition from the standpoint of stability, freedom from curdling, good dispersion, etc.

Attempts were made to insolubilize the casein of such casein-aluminum coating mixtures by treatment with formaldehyde, but without success. The coating compositions coagulated almost immediately after the formaldehyde treatment, making poor the dispersion on the paper, and the so-treated mixtures were generally useless as paper coating compositions.

It was discovered, however, that the casein of the aforesaid coating composition most unpredictably could be insolubilized, without concurrent coagulation or other disadvantageous result, by treating the prepared mixture with dimethylolurea. The so-treated composition remained smooth (i. e., did not curdle or coagulate or become grainy), and coatings on paper showed excellent dispersion. And, the resulting coatings enjoyed an enhanced resistance to water. It was found that the addition, to the prepared coating composition, of from 5 to 20 parts by weight of dimethylolurea per 100 parts of casein in the composition satisfactorily insolubilized the casein content. Much more dimethylolurea can be added without harmful effect, but the amounts stated are usually fully adequate to impart satisfactory water-resistance to the coating when properly dried or aged.

The following specific example in which "parts" are given as parts by weight, is illustrative of the invention.

100 parts of casein, 45 parts of urea and 5 parts of sodium pyrophosphate were well stirred into warm water in an amount of the latter sufficient to yield a 10% casein solution. Separately, finely divided aluminum flake was wetted out with about a tenth of its weight of butanol. The wetted aluminum flake was added to and well stirred in the casein solution, the aluminum being added in an amount sufficient to yield a suspension containing about 25 parts, dry weight, of casein for each 100 parts of the aluminum.

Thereupon there was stirred into the resulting composition a quantity of dimethylolurea equivalent to 16% by weight of the dry weight of the casein content of the composition, together with sufficient water to reduce the total solids content of the coating composition to about 25%. The suspension did not curdle or become grainy, but remained smooth and well disposed.

Coatings, on paper, made with the above described suspension showed good dispersion of the aluminum particles and an enhanced resistance to water on the part of the casein content of the coating.

As will be appreciated by those skilled in this art, known casein solvents may of course be used other than, or in addition to, those mentioned, and the pyrophosphate of the above specific composition may be substituted by another known dispersing agent; also the above specific proportions of ingredients are subject to reasonable variation without departure from the principles of the invention. The paper may be pretreated, on that side thereof which is to receive the aluminum coating, by application of an undercoat of mineral coating composition.

I claim:

1. A paper coating composition comprising finely divided aluminum, casein, urea, sodium pyrophosphate and dimethylolurea in an amount by weight of from 5 to 20% of the weight of the casein.

2. Process of preparing an aqueous paper coating composition, which comprises dispersing finely divided aluminum in an aqueous solution of casein containing urea and sodium pyrophosphate, and treating the resulting suspension with dimethylolurea in an amount by weight equal to from 5 to 20 percent of the weight of the casein content of the suspension.

3. A coated paper product comprising a paper base carrying on a surface thereof a coating consisting essentially of the dried residue of a composition containing finely divided aluminum, casein, urea, sodium pyrophosphate and dimethylolurea in an amount by weight of from 5 to 20% of the weight of the casein.

STANLEY J. JOHNSON.

REFERENCES CITED

The following references are of record in the file of this patent:

UNITED STATES PATENTS

| Number | Name | Date |
|---|---|---|
| 2,130,807 | Magill et al. | Sept. 20, 1938 |
| 2,133,335 | Wilson et al. | Oct. 18, 1938 |
| 2,293,385 | Dunham | Aug. 18, 1942 |
| 2,354,662 | Bryce | Aug. 1, 1944 |
| 2,362,884 | Clark | Nov. 14, 1944 |
| 2,377,761 | D'Alelio | June 5, 1945 |
| 2,459,408 | Bicknell | Jan. 18, 1949 |

Certificate of Correction

Patent No. 2,491,113                                                  December 13, 1949

STANLEY J. JOHNSON

It is hereby certified that error appears in the printed specification of the above numbered patent requiring correction as follows:

Column 2, line 41, after "comprising" insert the word and comma *water,*;

and that the said Letters Patent should be read with this correction therein that the same may conform to the record of the case in the Patent Office.

Signed and sealed this 28th day of March, A. D. 1950.

[SEAL]

THOMAS F. MURPHY,
*Assistant Commissioner of Patents.*